United States Patent [19]
Kato et al.

[11] Patent Number: 5,951,311
[45] Date of Patent: Sep. 14, 1999

[54] ROTARY CONNECTOR

[75] Inventors: Hironori Kato; Kimihiro Furuichi; Katsuya Mitsuzuka; Yukari Sano; Katsutoshi Uchida, all of Miyagi-ken, Japan

[73] Assignee: Alps Electric Co., Ltd., Tokyo, Japan

[21] Appl. No.: 08/908,668

[22] Filed: Aug. 7, 1997

[30] Foreign Application Priority Data

Aug. 19, 1996 [JP] Japan .................................. 8-217392

[51] Int. Cl.⁶ .................................................. H01R 3/00
[52] U.S. Cl. .......................................................... 439/164
[58] Field of Search .................. 439/164, 15; 200/61.54, 200/61.27

[56] References Cited

U.S. PATENT DOCUMENTS

| | | | |
|---|---|---|---|
| 5,229,544 | 7/1993 | Horiuchi et al. ........................ | 174/52.1 |
| 5,246,377 | 9/1993 | Kawahara et al. ....................... | 439/164 |
| 5,721,408 | 2/1998 | Yokota et al. ........................... | 439/164 |
| 5,766,019 | 6/1998 | Matsumoto et al. ....................... | 439/15 |
| 5,769,649 | 6/1998 | Welschholz et al. .................... | 439/164 |
| 5,773,776 | 6/1998 | Uleski et al. .............................. | 439/15 |
| 5,800,191 | 9/1998 | Honda et al. ............................ | 439/164 |
| 5,883,348 | 3/1999 | Yokoyama ................................ | 439/15 |

*Primary Examiner*—Gary F. Paumen
*Assistant Examiner*—Briggitte R. Hammond
*Attorney, Agent, or Firm*—Brinks Hofer Gilson & Lione

[57] ABSTRACT

To easily set a rotary connector to a steering system when providing various types of switches for the steering system. A fixed-side housing and a movable-side housing are rotatably connected each other to wind a flat cable in a storage space partitioned between the both housings. The fixed-side housing has an outer cylindrical portion for partitioning a part of the storage space and a support wall is integrally formed outside of the outer cylindrical portion through a gap. Moreover, a switch is set inside of the support wall, the switch is connected to a joint bar through a flexible substrate at the inside of the support wall and conductors of the flat cable extended from the outer cylindrical portion are also connected to the joint bar.

12 Claims, 7 Drawing Sheets

ROTARY CONNECTOR

BACKGROUND OF THE INVENTION

1. Field of the Invention

The present invention relates to a rotary connector for electrically connecting a pair of housings relatively rotatably coupled each other by a flexible cable.

2. Description of the Related Art

A rotary connector roughly comprises a pair of housings relatively rotatably coupled each other and a flexible cable wound at the inside of an annular storage space partitioned by the both housings, and the flexible cable is extended outward while the both ends of the flexible cable are secured to the both housings respectively and a connector terminal is provided for the outward-extended end of the cable. One of the both housings is used as a movable-side housing and the other of them is used as a fixed-side housing. When rotating the movable-side housing in the normal or reverse direction, the flexible cable is tightly wound or rewound at the inside of the storage space.

In the case of the roughly-constituted rotary connector, the fixed-side housing is secured to a combination switch which is a stator member of a steering system and the movable-side housing is connected to a steering wheel which is a rotor member of the steering system so that the movable-side housing rotates by interlocking with rotation of the steering wheel. In this case, an external connector is provided for the combination switch and the steering wheel respectively. By connecting these external connectors with the connector terminals provided for the both ends of the flexible cable, an air-bag inflator and a horn switch mounted on the steering wheel are connected to the combination switch side through the rotary connector.

A request for setting various switches to a steering system has been raised in recent years. For example, a steering system with a cruise control switch or audio switch mounted on the steering wheel side and a steering system with a hazard parking switch or seat positioning switch mounted on the combination switch side are proposed. However, because the space around a steering system is not very large, an external connector at the steering wheel side is increased in size as the number of switches mounted on the steering wheel side increases or a rotary-connector setting space is greatly decreased as the number of switches mounted on the combination switch side. In any case, there is a problem that the operability for setting a rotary connector to a steering system is deteriorated.

SUMMARY OF THE INVENTION

In the case of the present invention, a switch is provided with at least either of the fixed-side housing and movable-side housing of a rotary connector. By previously setting the switch to at least either housing, it is possible to easily set the rotary connector to a steering system.

DESCRIPTION OF THE PREFERRED EMBODIMENTS

A rotary connector of the present invention comprises a fixed-side housing, a movable-side housing rotatably connected to the fixed-side housing through an annular storage space, and a flexible cable wound at the inside of the storage space and electrically extended outward while the both ends of said cable are secured to said fixed-side housing and said movable-side housing respectively; in which a switch is set to at least either of the fixed-side and movable-side housings.

To set the switch to the fixed-side housing, it is preferable to integrally provide a support portion for the outside of an outer cylindrical portion of the fixed-side housing at a predetermined interval and set the switch to the support portion. In this case, by connecting a connector terminal provided for the outside end of the flexible cable and the switch each other inside of the support portion, it is also possible to connect the switch to an external connector simultaneously when connecting the connector terminal to the external connector.

Moreover, to set the switch to the movable housing, it is preferable to integrally provide a lower cover of a steering wheel for the top board of the movable housing and set the switch to the lower cover. In this case, by providing the inside end of the flexible cable along the lower cover directly or through a wiring board and setting the switch to the portion along the lower cover, it is unnecessary to connect the switch to the external connector.

Figure 1:
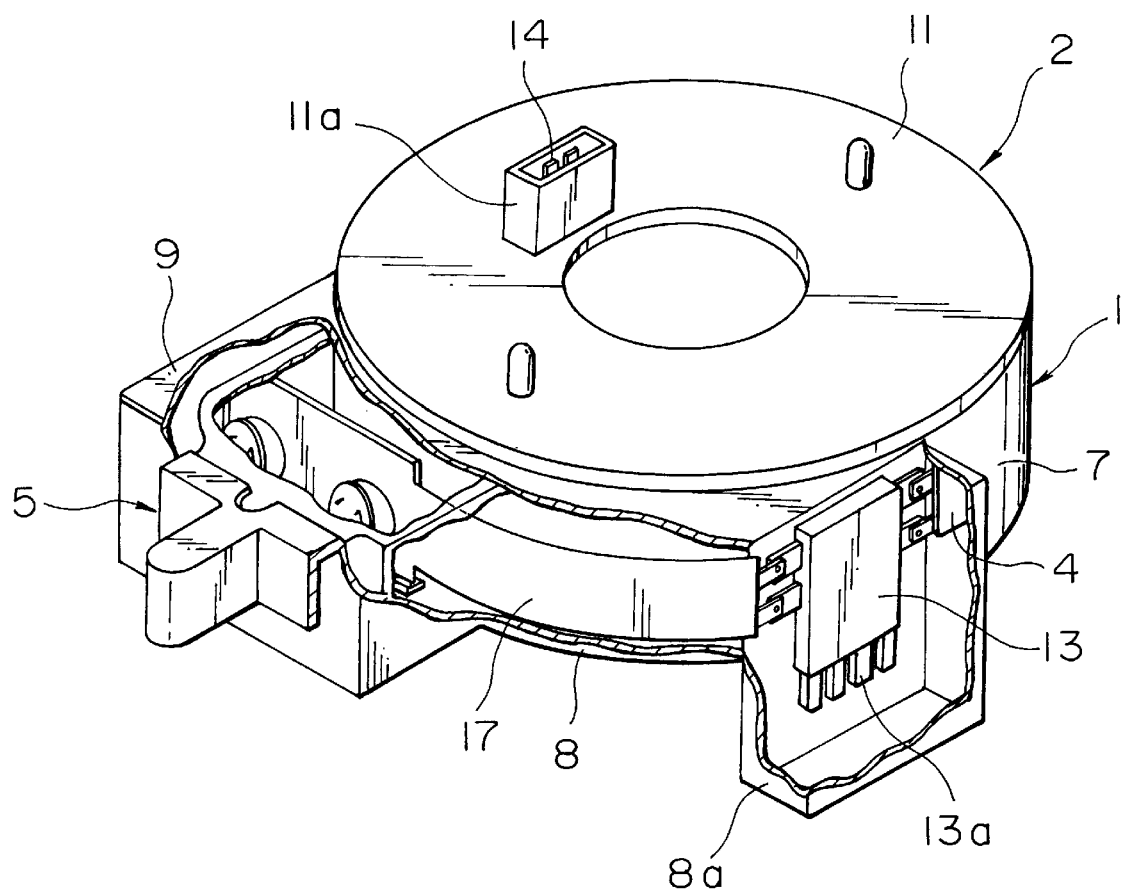
FIG. 1 is a perspective view showing the rotary connector of the first embodiment of the present invention by cutting out a part of the connector.
Figure 2:
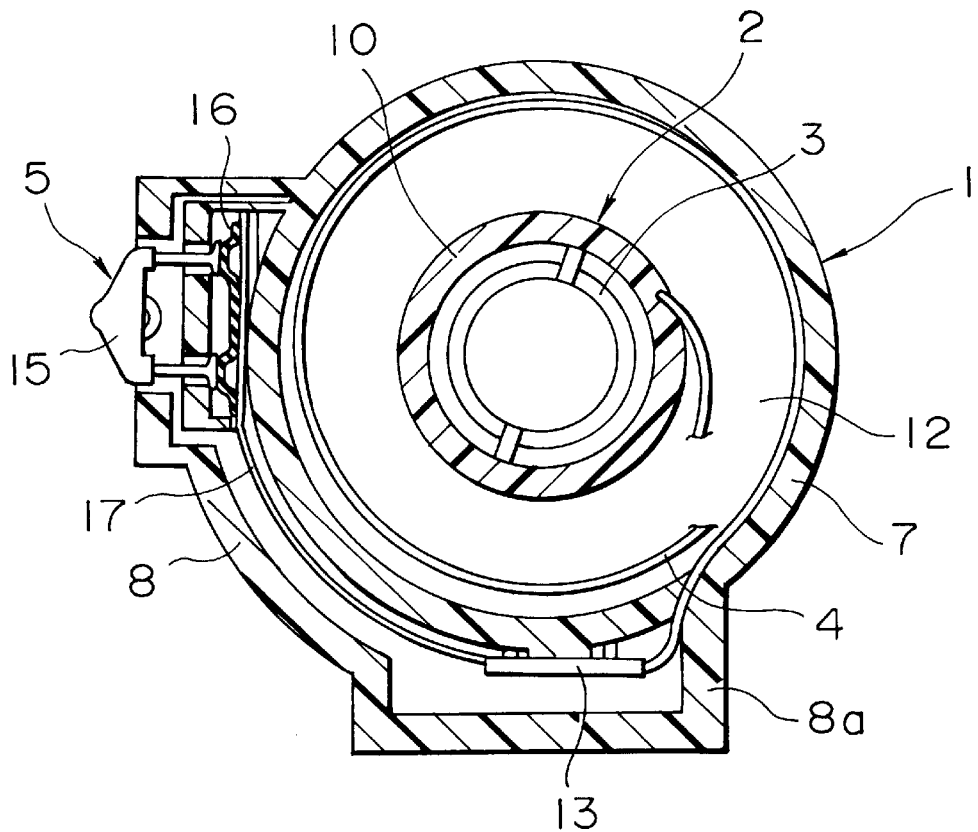
FIG. 2 is a transverse sectional view of the rotary connector in FIG. 1.
Figure 3:
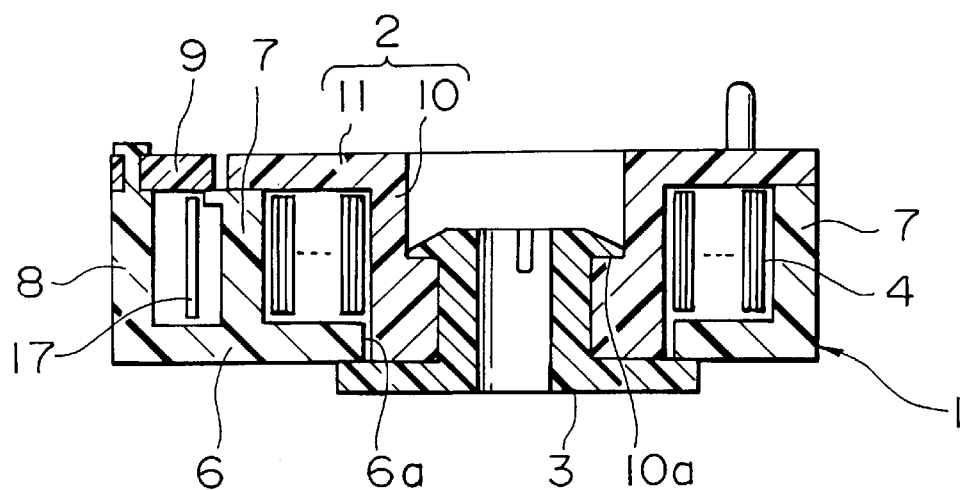
FIG. 3 is a longitudinal sectional view of the rotary connector in FIG. 1.

An embodiment of the present invention is described below by referring to the accompany drawings. FIG. 1 is a perspective view showing a rotary connector of the first embodiment by cutting out a part of the connector, FIG. 2 is a transverse sectional view of the rotary connector, and FIG. 3 is a longitudinal sectional view of the rotary connector.

As shown by these drawings, the rotary connector of this embodiment roughly comprises a fixed-side housing 1 made of synthetic resin, a movable-side housing made of the synthetic resin, a rotor snap 3 for rotatably connecting the both housings 1 and 2 each other, a flat cable 4 serving as a flexible cable, and a switch 5 set to the fixed-side housing 1.

The fixed-side housing 1 is integrally provided with a bottom plate 6 having a center hole 6a, a annular outer cylindrical portion 7 rising from the bottom plate 6, and a support wall 8 rising from the bottom plate 6, in which the outer periphery of the outer cylindrical portion 7 faces the support wall 8 through a gap. The gap is closed by a lid 9 set to the top of the support wall 8 but the bottom of a coupler frame 8a protruded to the support wall 8 is opened. Moreover, the movable-side housing 2 is integrally provided with an annular inner cylindrical portion 10 and an annular top board 11 horizontally extending from the top end of the inner cylindrical portion 10, in which a step port 10a is formed on the inner periphery of the inner cylindrical portion 10. The both housings 1 and 2 are rotatably connected each other by setting the rotor snap 3 between the bottom plate 6 and the step portion 10a and an annular storage space 12 is partitioned by the bottom plate 6 and outer cylindrical portion 7 of the fixed-side housing 1 and the inner cylindrical portion 10 and top board 11 of the movable-side housing 2.

The flat cable 4 is set inside of the storage space 12 and it is wound, for example, spirally. The flat cable 4 is constituted by laminating a plurality of conductors parallel with each other by a pair of insulating films. This embodiment uses a two-circuit flat cable 4 having two conductors. The outside end of the flat cable 4 is extended from the storage space 12 while being secured to the outer cylindrical portion 7 and each conductor of the flat cable 4 is soldered or welded to two out of four connector terminals 12a provided for a joint bar 13. The joint bar 13 is secured to the outer periphery of the outer cylindrical portion 7 and a portion where each connector terminal 13a is exposed from the bottom opening of the coupler frame 8a serves as a direct-coupling-type fixed-side connector. Moreover, the inside end of the flat cable 4 is led up to a coupler frame 11a formed on the top board 11 while it is secured to the inner cylindrical portion 10 and a portion where each conductor of the flat cable 4 is soldered or welded to a connector terminal 14 inside of the coupler frame 11a serves as a direct-coupling-type movable-side connector.

The switch 5 is set inside of the support wall 8 and used as, for example, a hazard parking switch. As shown in FIG. 2, the switch 5 is a seesaw switch provided with a swingable operation body 15, a rubber contact 16 driven by the operation body 15, and a flexible substrate 17, in which a part of the operation body 15 protrudes outward beyond the support wall 8. The rubber contact 16 and a pair of detachable fixed contact (not illustrated) are formed on the flexible substrate 17 and the leads of these fixed contact are soldered or welded to the remaining two connector terminals 13a of the joint bar 13.

The rotary connector thus constituted is used for a steering system of an automobile, in which the fixed-side housing 1 is secured onto a combination switch and the movable-side housing 2 is connected to a steering wheel. In this case, the coupler frame 8a serving as a fixed-side connector is inserted into a not-illustrated external connector provided for the combination switch and each conductor of the flat cable 4 and the switch 5 are connected to the external connector. Moreover, the coupler frame 11a serving as a movable-side connector is inserted into a not-illustrated external connector provided for the steering wheel and the conductors of the flat cable 4 and each conductor of the flat cable 4 is connected to the external connector. As a result, an air-bag inflator mounted on the steering wheel is connected to the combination-switch side through the flat cable 4 of the rotary connector and moreover, the switch 5 serving as a seesaw switch set to the fixed-side housing 1 of the rotary connector is connected to the combination-switch side.

To use the rotary connector, by rotating the steering wheel clockwise or counterclockwise, the torque is transmitted to the movable-side housing 2 and the movable-side housing 2 rotates in the same direction. For example, by rotating the steering wheel counterclockwise from its rotation neutral position, the movable-side housing 2 also rotates counterclockwise by interlocking with the steering wheel and the flat cable 4 is tightly wound on the outer periphery of the inner cylindrical portion 10. When rotating the steering wheel clockwise from its rotation neutral position, however, the movable-side housing 2 also rotates clockwise by interlocking with the steering wheel and is rewound on the inner periphery of the outer cylindrical portion 7. In any state, the electrical connection between the both housings 1 and 2 is maintained through the flat cable 4.

In the case of the above first embodiment, because the switch 5 is previously set to the support wall 8 of the fixed-side housing 1, it is unnecessary to secure a space for setting the switch 5 at the combination-switch side of the steering system or provide wiring for the switch 5, and it is possible to easily set the rotary connector to the steering system. Moreover, when connecting the conductors of the flat cable 4 with the switch 5 through the joint bar 13 in the support wall 8, it is possible to connect each conductor of the flat cable 4 and the switch 5 to an external connector by inserting a formed direct-coupling-type fixed-side connector into the external connector of the combination switch and thereby, it is also possible to simplify the rotary-connector setting operation.

Figure 7:
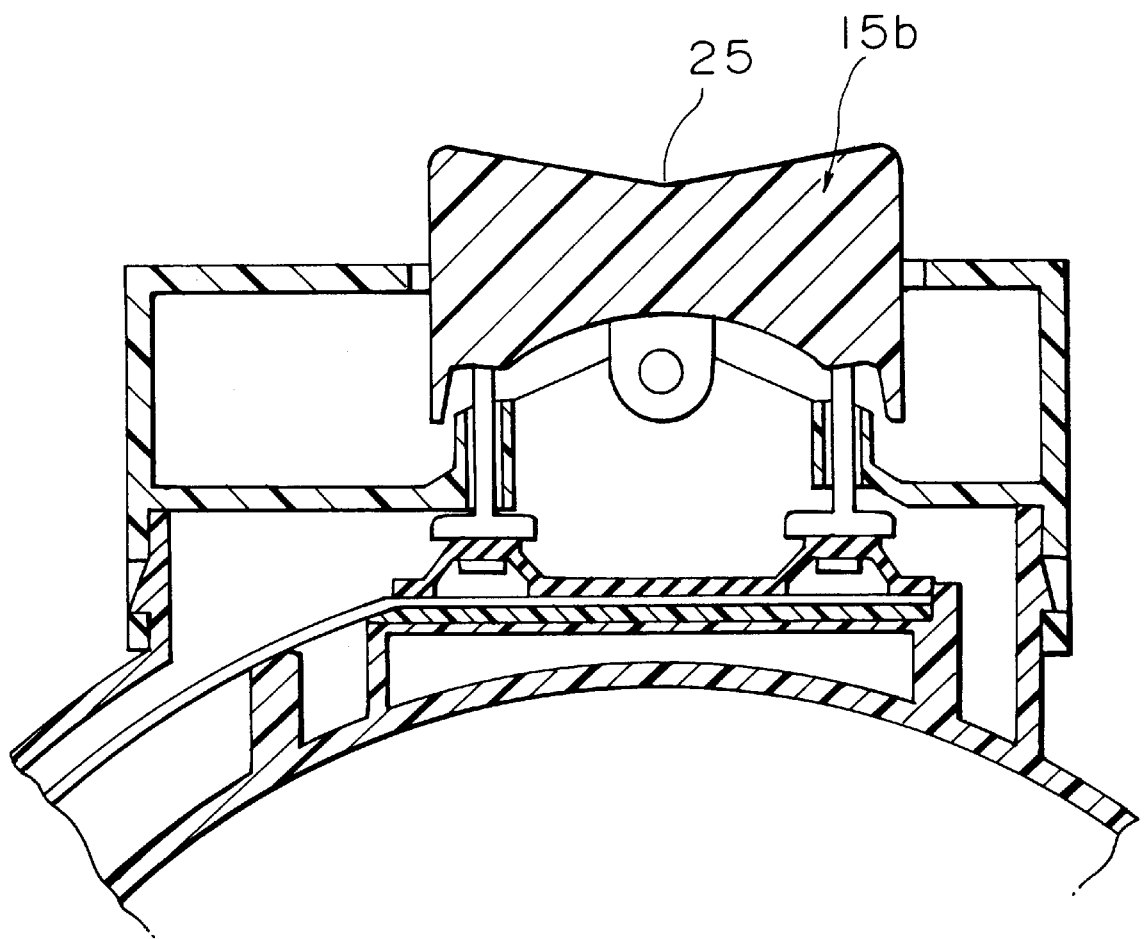
FIG. 7 is a sectional view of an essential portion showing a modification of a switch.
Figure 8:
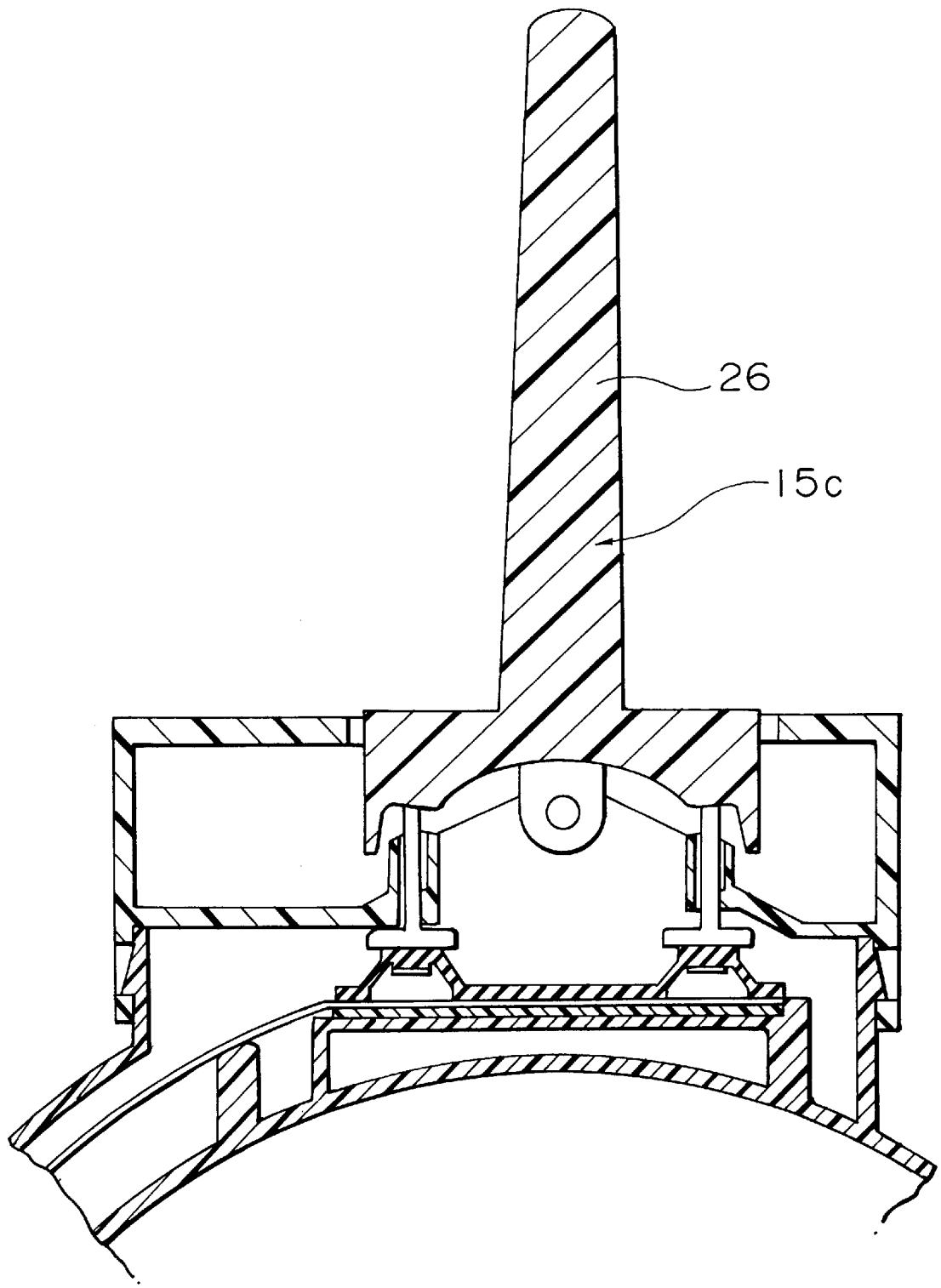
FIG. 8 is a sectional view of an essential portion showing a modification of a switch.

Moreover, in the case of the first embodiment, by replacing the swingable operation body 15 of the switch 5 with an operation body 15b or 15c as shown in FIGS. 7 and 8, manipulating conditions can be changed without changing peripheral structures. That is, as shown in FIG. 7, by replacing the operation body 15 with the operation body 15b having a recess 25 at its center, pressing directions are changed in accordance with the finger for turning on/off two contacts compared to the case of using the operation body 15 shown in FIG. 1. Therefore, the switching feeling is changed. Moreover, as shown in FIG. 8, by replacing the operation body 15 with the operation body 15c having a long lever portion 26 at its center, the body 15c can be used as a lever switch for winkers. Therefore, in the case of this embodiment, because the operation body 15 of the switch 5 can be replaced without changing peripheral structures, it is possible to change the body 15 to various types of switches and moreover, achieve the standardization because it is unnecessary to change other portions.

Figure 4:
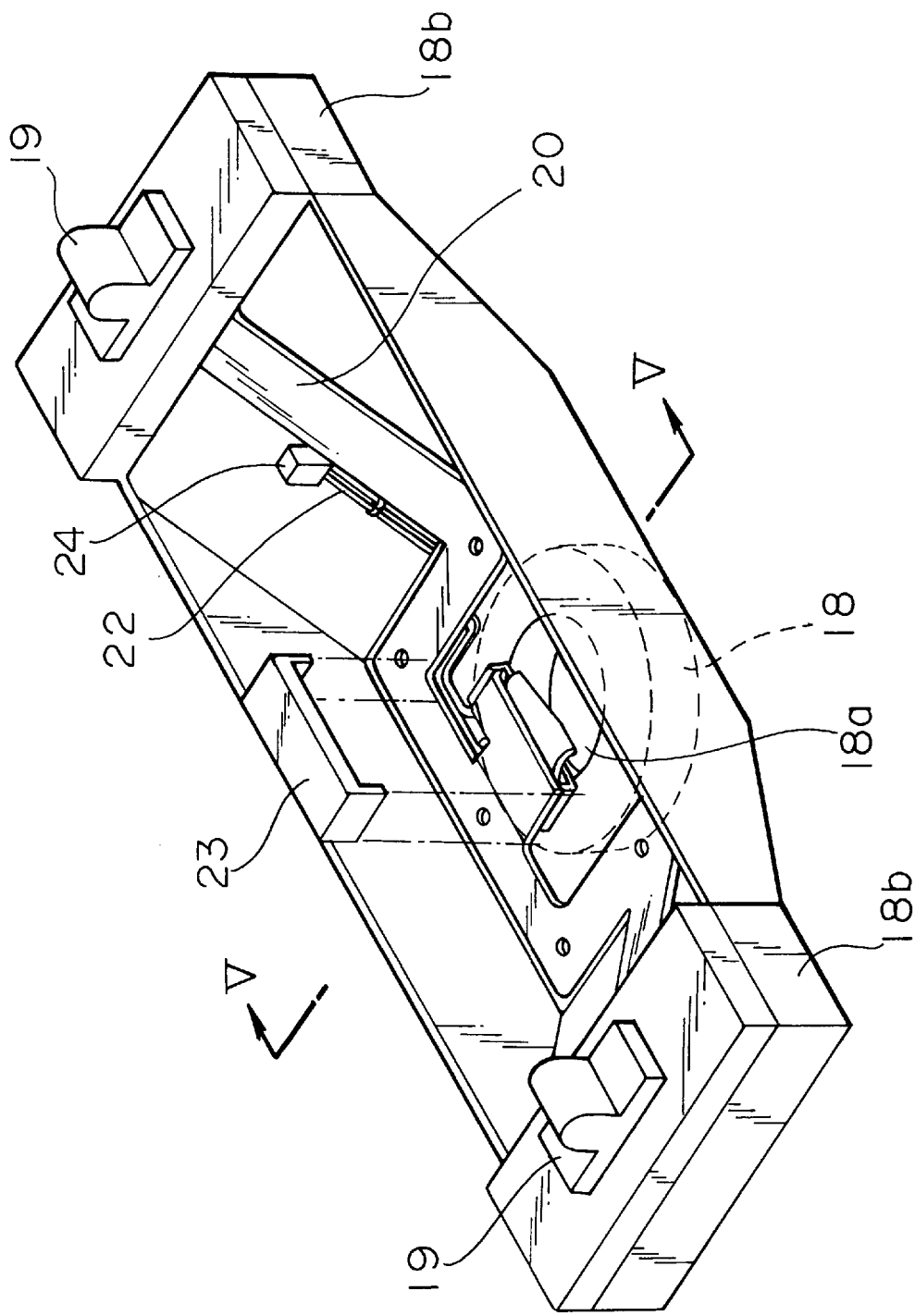
FIG. 4 is a perspective view of the rotary connector of the second embodiment of the present invention.
Figure 5:
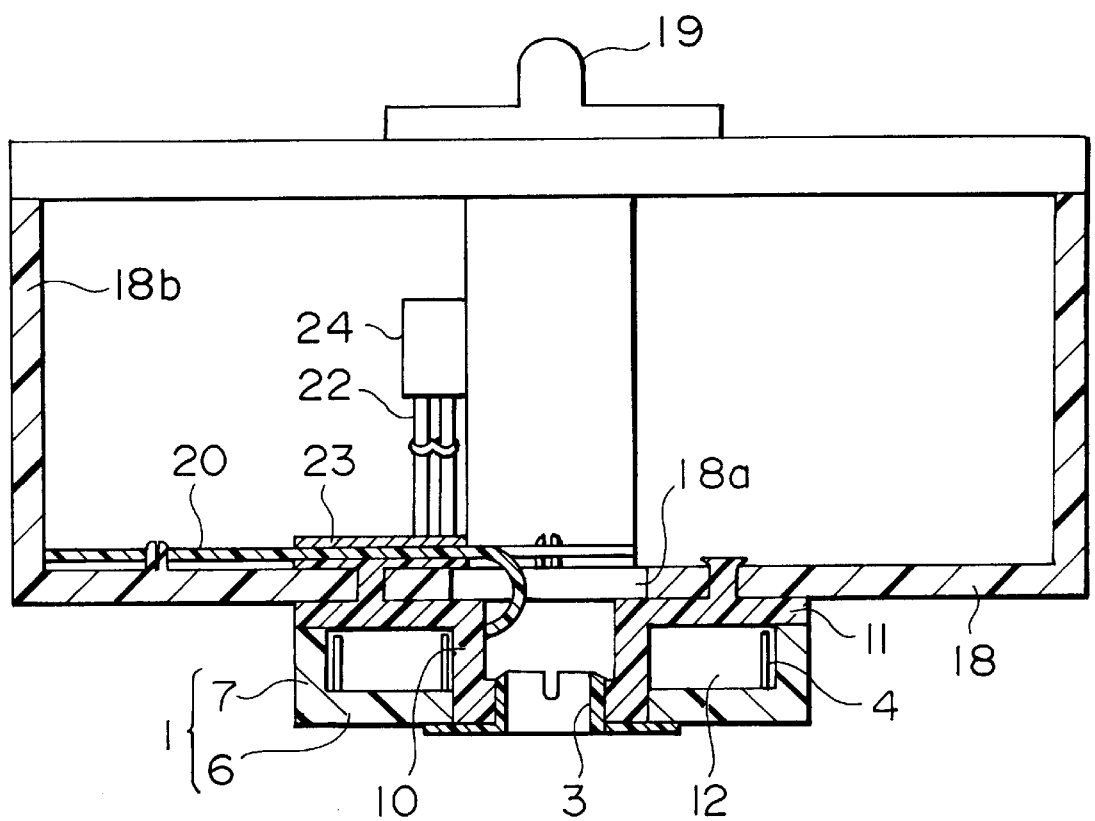
FIG. 5 is a sectional view along the line V—V in FIG. 4.
Figure 6:
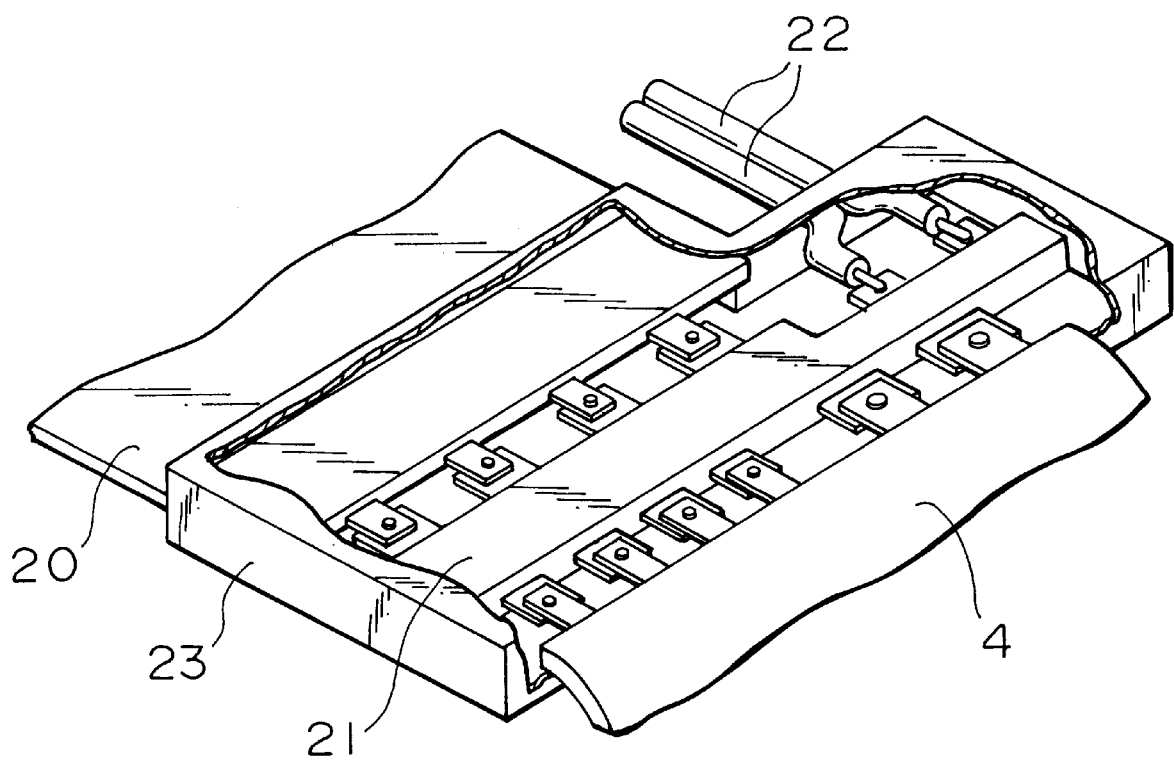
FIG. 6 is an illustration showing the movable-side extension portion of the rotary connector in FIG. 4.

FIG. 4 is a perspective view of the rotary connector of the second embodiment of the present invention, FIG. 5 is a sectional view along the line V—V in FIG. 4, and FIG. 6 is an illustration showing the movable-side extension portion of the rotary connector, in which a portion corresponding to those in FIGS. 1 to 3 is provided with the same symbol.

In the case of the second embodiment, a lower cover 18 normally set to the steering wheel side is integrated with the movable-side housing 2 of the rotary connector and a switch 19 is set to the lower cover 18. That is, the fixed-side housing 1 comprises the bottom plate 6 and the outer cylindrical portion 7 but the support wall 8 is not formed though it is formed in the case of the above first embodiment. The movable-side housing 2 comprises the integrally-formed inner cylindrical portion 10, top board 11, and the lower cover 18 integrated with the top board 11. These housings 1 and 2 are rotatably connected each other by the rotor snap 3. The lower cover 18 is made of a material with a high rigidity such as a metallic plate and secured to the upper side of the top board 11 by means of, for example, thermal caulking. A through-hole 18a through which a steering shaft can be passed is drilled at the center of the lower cover 18 and the switch 19 is set to the support portion 18b at the both ends respectively. These switches 19 are used as, for example, cruise control switches and a flexible substrate 20 connected to the both switches 19 is set on the lower cover 18.

The annular storage space 12 is partitioned between the fixed-side housing 1 and the movable-side housing 2 and the flat cable 4 is wound at the inside of the storage space 12. In the case of this embodiment, a six-circuit flat cable 4 having six conductors is used, and the outside end of the flat cable 4 is extended from the storage space 12 while it is secured to the outer cylindrical portion 7 and a not-illustrated fixed-side connector is set to its front end.

Moreover, the inside end of the flat cable 4 is extended from the storage space 12 while it is secured to the inner cylindrical portion 10 and, as shown in FIG. 6, each conductor of the flat cable 4 is soldered or welded to six terminals protruded from one side of a joint bar 21 at the extended portion. Moreover, the flexible substrate 20 is soldered to four out of six terminals protruded from the other side of the joint bar 21 and a pair of lead wires are soldered to the remaining two terminals and a cover 23 is provided for the joint of the joint bar 21. Each lead wire 22 is wired around on the lower cover 18 and a movable-side connector 24 is set to its front end.

The rotary connector thus constituted is used for a steering system of an automobile, the fixed-side housing 1 is secured onto a combination switch, and the lower cover 18 of the movable-side housing 2 is set to the back of a pad of a steering wheel. In this case, a not-illustrated fixed-side connector is connected to an external connector provided for the combination switch and the movable-side connector 24 is connected to an air-bag external connector provided for the steering wheel. As a result, an air-bag inflator mounted on the steering wheel and the switch 19 set to the lower cover 18 are connected to the combination switch side through the flat cable 4 of the rotary connector.

In the case of the second embodiment, the switch 19 is set to the lower cover 18 integrated with the movable-side housing 2 and it is previously connected the conductor of the flat cable 4. Therefore, the terminals necessary for the external connector at the steering wheel side requires only the number of terminals corresponding to the movable-side connector 24 and it is possible to easily set the rotary connector to the steering system.

In the case of each of the above embodiments, cases are described in which the switch 5 is set to the fixed-side housing 1 and in which the switch 19 is set to the movable-side housing 2. However, it is also possible to set a switch to both the fixed-side housing 1 and the movable-side housing 2. Moreover, in the case of the second embodiment, it is possible to omit the joint bar 21 and the flexible substrate 20 and directly mount the switch 19 on the flat cable 4 extended from the storage space 12.

The present invention is realized by the above-described embodiments and has the following advantages.

By setting a switch to at least either of the fixed-side housing and movable-side housing of a rotary connector, it is possible to easily set the rotary connector to a steering system.

Moreover, to set a switch to a fixed-side housing, by providing a support portion for the outside of the outer cylindrical portion of the fixed-side housing at a predetermined interval and connecting the switch set to the support portion with the outside end of a flexible cable at the inside of the support portion, it is possible to connect the switch to an external connector simultaneously when connecting a connector terminal of the fixing end side of a flexible cable to the external connector.

Furthermore, to set the switch to a movable-side housing, it is unnecessary to connect the switch to an external connector by integrally provide the lower cover of a steering wheel for the top board portion of the movable-side housing and connecting the switch set to the lower cover with the inside end of a flexible cable directly or through a wiring board.

What is claimed is:

1. A rotary connector comprising a fixed-side housing, a movable-side housing rotatably connected to the fixed-side housing through an annular storage space, and a flexible cable wound at the inside of said storage space and electrically extended outward while the both ends of said cable are secured to said fixed-side housing and said movable-side housing respectively; wherein a switch is provided with said fixed-side housing.

2. A rotary connector comprising a fixed-side housing, a movable-side housing rotatably connected to the fixed-side housing through an annular storage space, and a flexible cable wound at the inside of said storage space and electrically extended outward while the both ends of said cable are secured to said fixed-side housing and said movable-side housing respectively; wherein a switch is provided with said movable-side housing.

3. The rotary connector according to claim 1, wherein said fixed-side housing has an outer cylindrical portion for defining said storage space, a support portion is integrally provided with the outside of said outer cylindrical portion at a predetermined interval, and said switch is provided with said support portion.

4. The rotary connector according to claim 2, wherein said fixed-side housing has an outer cylindrical portion for defining said storage space, a support portion is integrally provided with the outside of said outer cylindrical portion at a predetermined interval, and said switch is set to said support portion.

5. The rotary connector according to claim 3, wherein a connector terminal provided with the outside end of said flexible cable and said switch are connected each other inside of said support portion.

6. The rotary connector according to claim 5, wherein the connector terminal provided with the outside end of said flexible cable and the switch of said fixed-side housing are connected to each other inside of said support portion.

7. The rotary connector according to claim 1, wherein said movable-side housing has a top board for defining said storage space, a lower cover of a steering wheel is integrally provided for the top board, and a switch is provided with said lower cover.

8. The rotary connector according to claim 2, wherein said movable-side housing has a top board for defining said storage space, a lower cover of a steering wheel is integrally provided with the top board, and said switch is provided with said cover.

9. The rotary connector according to claim 7, wherein the inside end of said flexible cable is provided along said lower cover directly or through a wiring board and said switch of said movable-side housing is provided with the portion along the lower cover.

10. The rotary connector according to claim 8, wherein the inside end of said flexible cable is provided along said lower cover directly or through a wiring board and said switch is provided with a portion along the lower cover.

11. A rotary connector comprising a fixed-side housing, a movable-side housing rotatably connected to the fixed-side housing through an annular storage space, and a flexible cable wound at the inside of said storage space and electrically extended outward while the both ends of said cable are secured to said fixed-side housing and said movable-side housing respectively; wherein said fixed-side housing has an outer cylindrical portion for defining said storage space, a support portion is integrally provided with the outside of the cylindrical portion at a predetermined interval, and a switch is provided with said support portion.

12. A rotary connector comprising a fixed-side housing, a movable-side housing rotatably connected to the fixed-side housing through an annular storage space, and a flexible cable wound at the inside of said storage space and electrically extended outward while the both ends of said cable are secured to said fixed-side housing and said movable-side housing respectively; wherein said fixed-side housing has an outer cylindrical portion for defining said storage space, a support portion is integrally provided with the outer cylindrical portion at a predetermined interval, and a connector terminal provided with the outside end of said flexible cable and a switch are connected to each other at the inside of said support portion.

* * * * *

UNITED STATES PATENT AND TRADEMARK OFFICE
CERTIFICATE OF CORRECTION

PATENT NO. : 5,951,311
DATED : September 14, 1999
INVENTOR(S) : Hironori Kato et al.

It is certified that error appears in the above-identified patent and that said Letters Patent is hereby corrected as shown below:

On the Title Page

In column 2, line 4, under "ABSTRACT", after "connected" insert --to--.

In column 2, line 5, delete "the" (first occurrence).

In claim 1, line 5, delete "the".

In claim 2, line 5, delete "the".

In claim 5, line 3, after "connected" insert --to--.

In claim 6, line 1, change "5" to --4--.

In claim 11, line 5, delete "the".

UNITED STATES PATENT AND TRADEMARK OFFICE
CERTIFICATE OF CORRECTION

PATENT NO. : 5,951,311
DATED : September 14, 1999
INVENTOR(S) : Hironori Kato et al.

In claim 12, line 5, delete "the".

Signed and Sealed this

Fifteenth Day of August, 2000

Attest:

Q. TODD DICKINSON

*Attesting Officer*  *Director of Patents and Trademarks*